United States Patent
Gonidec et al.

(10) Patent No.: US 6,170,255 B1
(45) Date of Patent: Jan. 9, 2001

(54) TURBOJET THRUST REVERSER WITH DOWNSTREAM OBSTACLES

(75) Inventors: Patrick Gonidec, Montivilliers; Pascal Gérard Rouyer, Saint Aubin Routot; Guy Bernard Vauchel, Le Havre, all of (FR)

(73) Assignee: Hispano-Suiza Aerostructures (FR)

( * ) Notice: Under 35 U.S.C. 154(b), the term of this patent shall be extended for 0 days.

(21) Appl. No.: 09/381,968

(22) PCT Filed: Feb. 4, 1999

(86) PCT No.: PCT/FR99/00236
§ 371 Date: Oct. 1, 1999
§ 102(e) Date: Oct. 1, 1999

(87) PCT Pub. No.: WO99/40311
PCT Pub. Date: Aug. 12, 1999

(30) Foreign Application Priority Data

Feb. 4, 1998 (FR) .................................................. 98 01276

(51) Int. Cl.[7] ...................................................... F02K 1/70
(52) U.S. Cl. ............................................................. 60/226.2
(58) Field of Search .................................. 60/226.2, 230

(56) References Cited

U.S. PATENT DOCUMENTS

| | | | |
|---|---|---|---|
| 2,929,204 | * 3/1960 | Sullivan et al. | 60/35.54 |
| 3,601,992 | * 8/1971 | Maison | 60/226 |
| 3,739,582 | * 6/1973 | Maison | 60/226 A |
| 5,039,171 | * 8/1991 | Lore | 239/265.29 |
| 5,117,630 | * 6/1992 | Cariola et al. | 60/226.2 |
| 5,243,817 | * 9/1993 | Matthias | 60/226.2 |
| 5,987,880 | * 11/1999 | Culbertson | 60/204 |

FOREIGN PATENT DOCUMENTS

| | | | |
|---|---|---|---|
| 0836000A1 | * 4/1998 | (EP) | 60/226.2 |
| 0848153A1 | * 6/1998 | (EP) | 60/226.2 |

* cited by examiner

*Primary Examiner*—Charles G. Freay
*Assistant Examiner*—Ehud Gartenberg
(74) *Attorney, Agent, or Firm*—Bacon & Thomas PLLC

(57) ABSTRACT

A thrust reverser for a turbojet engine comprising displaceable downstream baffles (2) which are integrated into the outer wall of the annular bypass-flow duct so as to form the downstream end of the exhaust nozzle of the turbojet engine during the operation of the turbojet engine in a forward-thrust mode is provided. When in a thrust-reversal mode, the downstream baffles (2) are positioned so as to deflect the bypass flow and obtain thrust reversal. The baffles (2) are pivotably mounted on stationary pivots (10) and have at least one associated displacement mechanism (6, 7) for driving the baffles (2). Each downstream baffle (2) has an associated displaceable inner panel (13). Each baffle (2) and the associated inner panel (13) are driven through different angular displacements by the at least one associated displacement mechanism (6, 7), which is common to the baffle (2) and the associated inner panel (13), to change between the forward-thrust mode and the thrust-reversal mode. The at least one associated displacement mechanism (6, 7) is preferably mounted in a stationary manner on a stationary structure of the thrust reverser.

14 Claims, 5 Drawing Sheets

TURBOJET THRUST REVERSER WITH DOWNSTREAM OBSTACLES

BACKGROUND OF THE INVENTION

1. Field of the Invention

The present invention relates to a turbojet-engine thrust reverser having downstream baffles designed to be mounted on turbojet-type aircraft engines with bypass or single flow.

2. Description of the Related Art

French patent document 2,622,928 A illustrates one design of a thrust reverser having downstream baffles and implementing thrust reversal of the bypass, or cold, flow of a bypass turbojet-engine. This kind of thrust reverser comprises downstream or clamshell baffles which, besides implementing the reversal of either the bypass flow or the whole flow, also constitute the exhaust nozzle in the forward-thrust mode. The downstream edge of said baffles therefore constitutes the downstream end of the of the outer duct wall, in the latter case of the annular circulation duct of the bypass flow where a bypass turbojet-engine is concerned. The baffles are pivotably mounted on the stationary thrust-reverser structure.

FIGS. 1 and 2 of the attached drawings show an embodiment of this kind of a known thrust reverser in the forward-thrust mode and in the thrust reversal mode, respectively. In this instance, the thrust reverser consists of a stationary upstream structure 1 affixed to the turbojet engine or its cowling and comprises an inner wall externally bounding the annular duct for circulation the flow, an external stationary fairing affixed to the inner wall, and two side structures 5. Two downstream baffles 2 are pivotably mounted on the stationary structure, in particular by pivots 10 resting on the side structures 5 which also support a control system 6 for the displacements and the locking of the baffles 2. In this embodiment, a linkrod 7 connects, by its end 8, the movable part of the actuator 6 to the baffle 2 at a point 9. The downstream edge 4 of the baffles 2 constitutes the trailing edge of the outer wall by extending the fairing in the downstream direction and is not coplanar. At its upstream end, the baffle 2 comprises a spoiler 12 for guiding the reversed flow.

In the known solutions according to French patent 2,348, 3712 A, U.S. Pat. NO. 5,176,340 or British patent 2,252,279 A, wherein the pivots of the downstream baffles are stationary, these baffles incur the drawback that their inner contour is unchanging relative to their outer contour. As a result, when in the extended position, the orientation of the inner contour depends on the global displacement of the baffle, this displacement being restricted to making contact with the downstream edge of said baffles in order to increase thrust-reverser efficiency. This design entails an oblique, downstream cutout in the nozzle exhaust, and consequently incurs aerodynamic losses in the forward thrust mode. Such losses are eliminated according to the U.S. Pat. No. 5,176, 340 and British patent 2,252,279 A by a dedicated mechanical system associated to the baffles.

According to British patent 2,168,298 A, the baffle comprises of an outer and an inner panel. However, this baffle incurs the major drawback of the panels fitted with independent control systems, resulting in an increase in weight and in problems synchronizing movement of the two panels. Moreover, the technology is restrained to central pivoting, thus being required to have a downstream deviation of the internal panel entailing a large central gap and a downstream deviation of the external panel obliquely covering, over the internal panel with discontinuity of the streamlines. These associated components cause large aerodynamic perturbations in the forward-thrust mode.

SUMMARY OF THE INVENTION

A turbojet-engine thrust reverser of the above kind which meets such conditions in the absence of the drawbacks of the designs known in the prior state of the art designs is characterized in that each downstream baffle has a movable inner panel with said baffle and said inner panel moving through different angular displacements when moving into the thrust-reversal position, and in that the downstream baffle and the associated inner panel are driven by a common displacement mechanism and in that said displacement mechanism is affixed in a stationary manner on the stationary structure of the thrust-reverser.

BRIEF DESCRIPTION OF THE DRAWINGS

Other features and advantages of the invention will be better understood from the reading of the following description of the preferred embodiments of the invention, with reference to the attached drawings, in which.

DETAILED DESCRIPTION OF THE PREFERRED EMBODIMENTS

Figure 1:
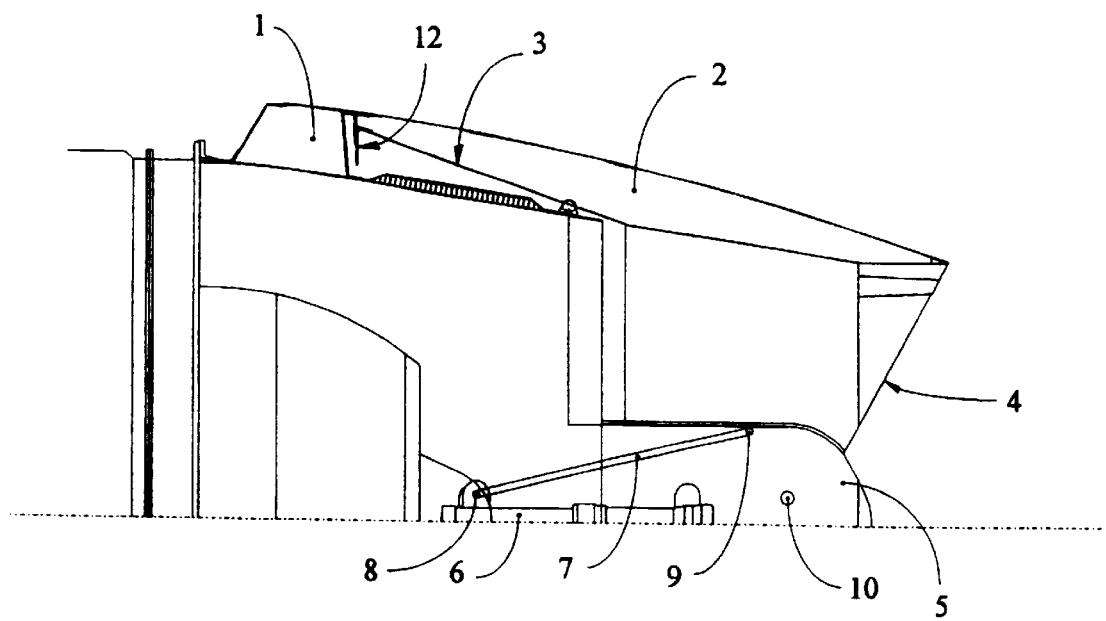
FIG. 1 shows a half schematic, longitudinally sectional view, in a plane passing through the axis of rotation, of the rear portion of a turbojet engine fitted with a known thrust reverser with downstream baffles.
Figure 2:
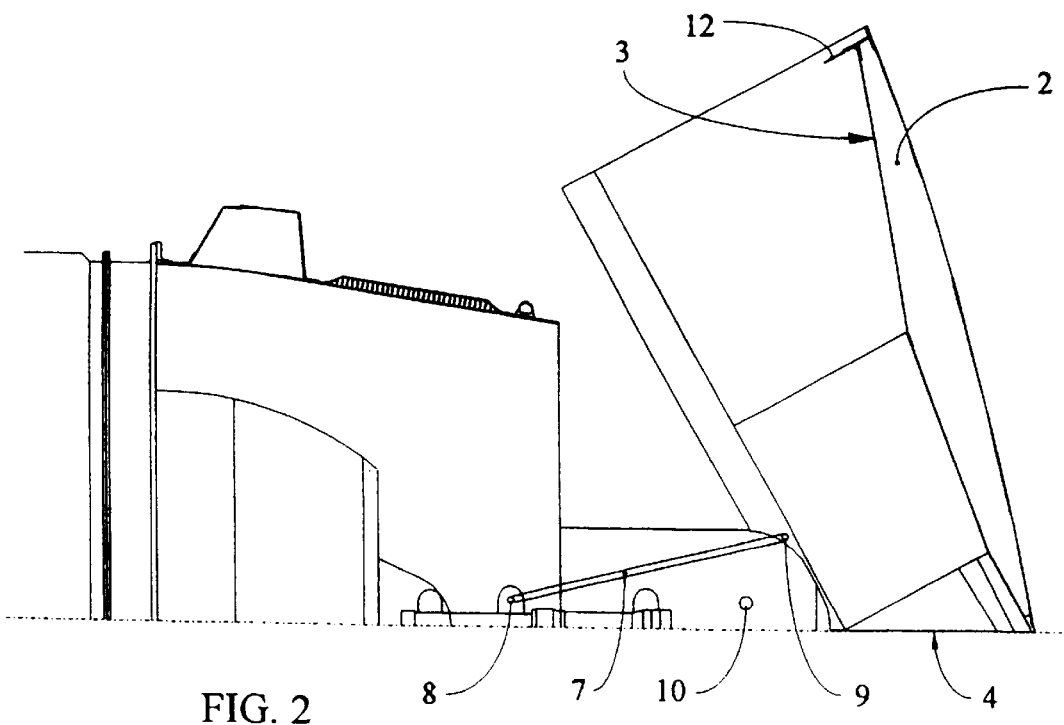
FIG. 2 shows a known embodiment of the type shown in FIG. 1 when in the thrust-reversal mode.
Figure 3:
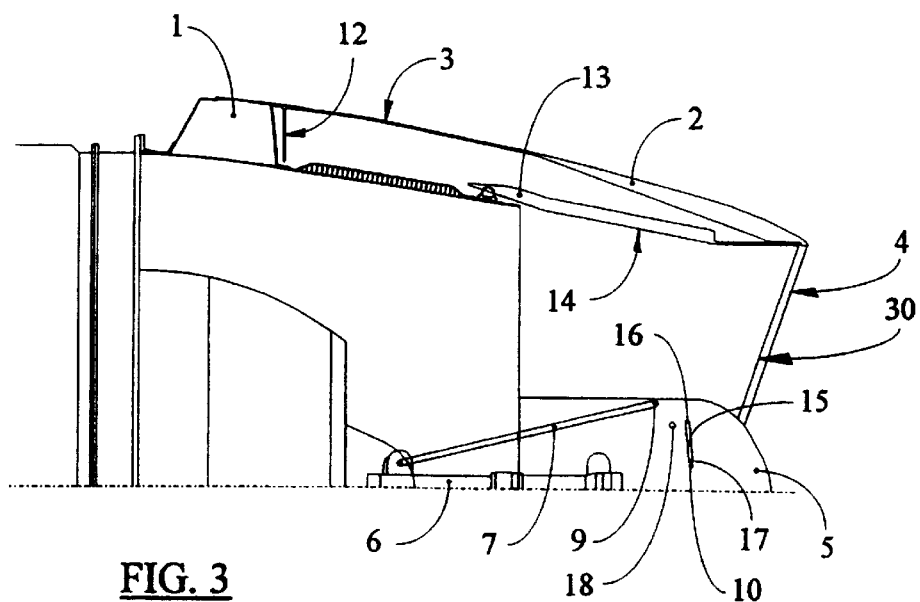
FIG. 3 shows a half-view similar to FIG. 1 of a thrust reverser fitted with downstream baffles of an embodiment of the invention and comprising a retracting inner panel pivoting about a displaceable pivot.
Figure 4:
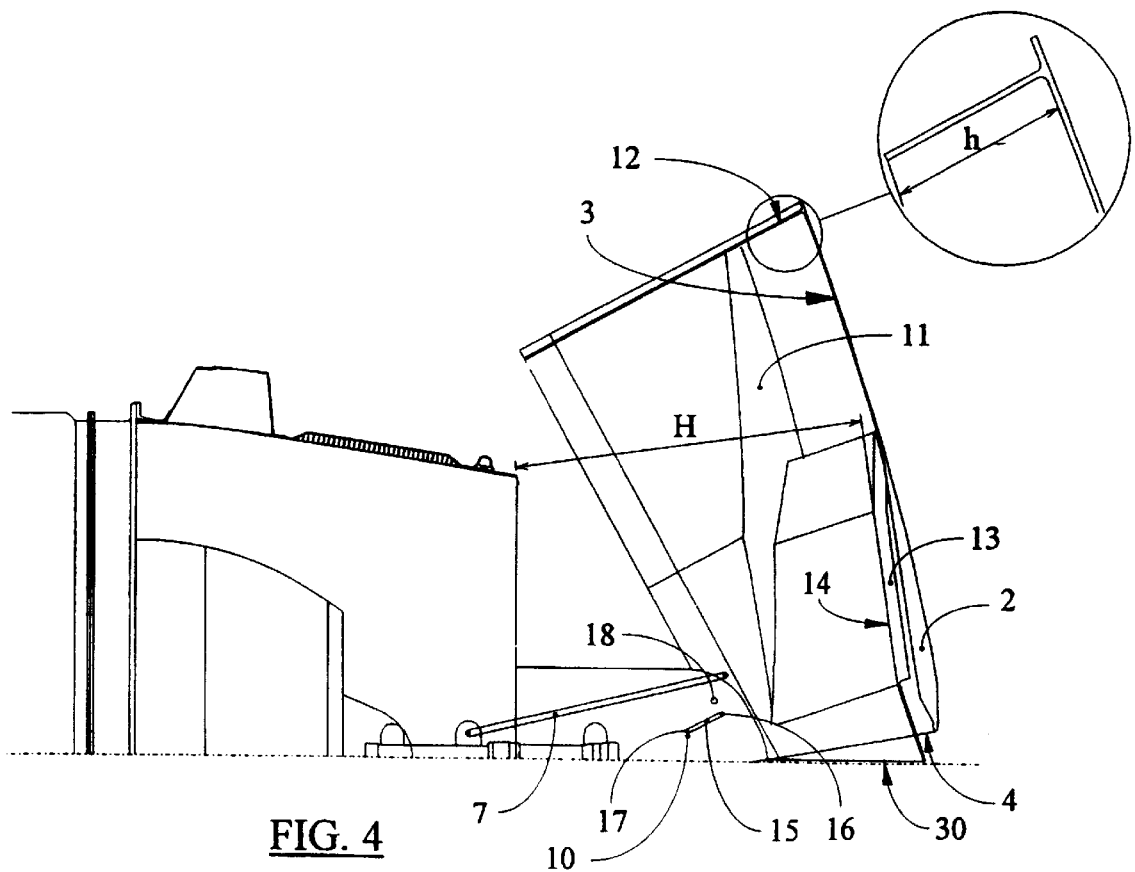
FIG. 4 shows an embodiment of the invention shown in FIG. 3 when in the thrust-reversal mode.
Figure 5:
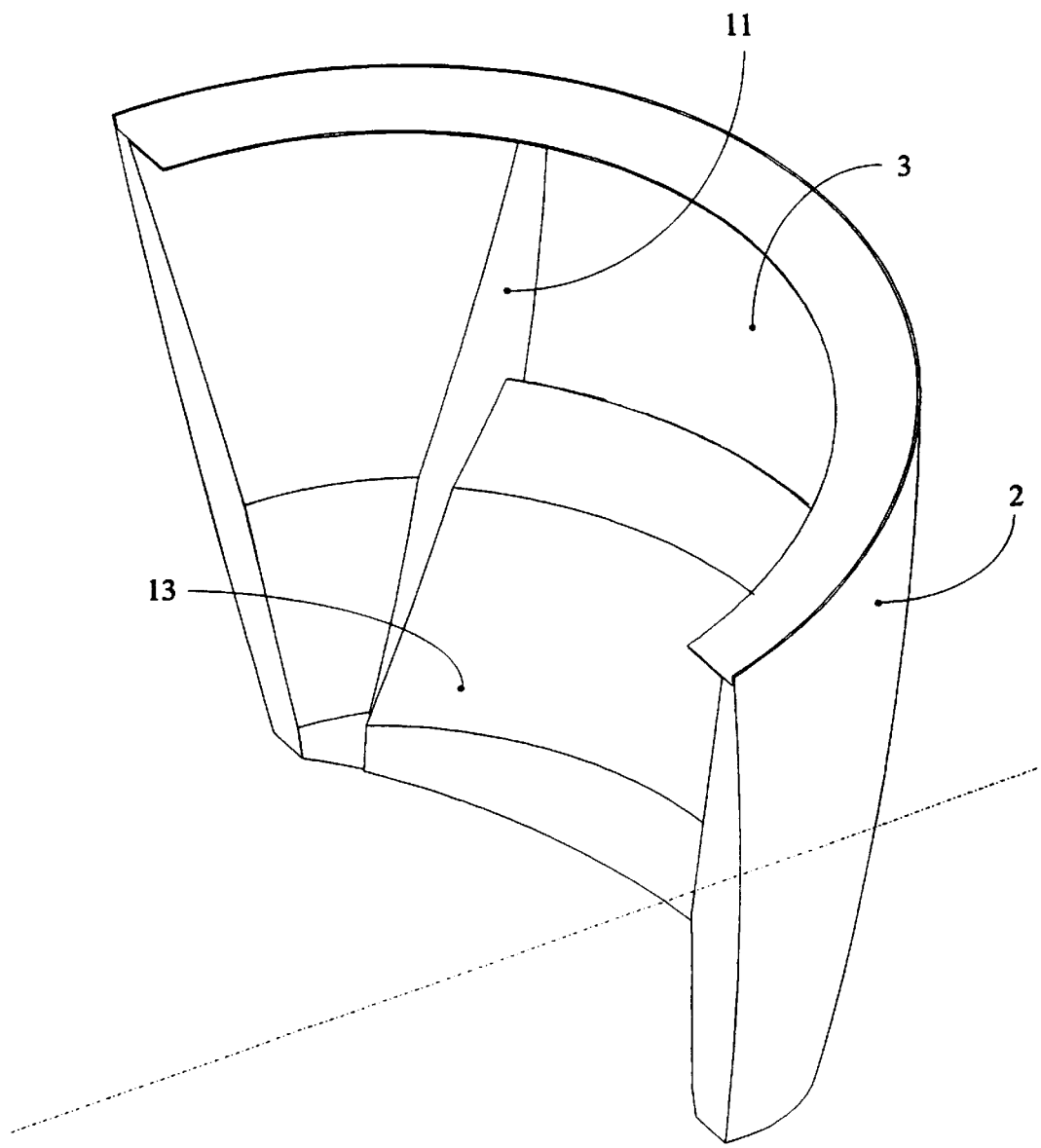
FIG. 5 shows a half schematic perspective view of the panel and baffle shown in FIG. 4 when in the thrust-reversal mode.

As regards an embodiment of the invention shown in FIGS. 3, 4 and 5, a downstream baffle 2 articulated about a pivot point 10, rigidly joined to the stationary structure, turns to overlap with the stationary structure 1 at its upstream side and with the inner panel 13 at its downstream side. The inner panel 13 is articulated about a pivot point 18 rigidly joined to the baffle 2.

While the inner panel 13 may comprise a structure linking the inner structure of the side beams 5 in the forward-thrust position, it may also be restricted in width, which in this case a central cavity with a matching end 3 and sides 11 is designed into the structure of the downstream panel 2. This configuration of the baffle 2 allows it to receive the inner panel 13 in the thrust-reversal mode and assures improved guidance for the exhaust flow; it is to be noted that the side cutouts of the inner panel 13 may be symmetric, or offset relative to the central axis of the baffle 2 and more or less extended.

The deployment of the baffles into the thrust-reversal position is realized by an actuator 6 generally situated in the side beams 5 of the stationary structure 1, driving a linkrod 7 of which one end is connected to the point 9 rigidly joined to the baffle 2, thereby setting this baffle and its displaceable associated panel 13 in rotation about the pivot point 10 solidly joined to the stationary structure. In the course of this motion, the linkrod 15 of which one end is connected to the beam 5 at the pivot point 17, the other end being connected to the inner panel 13 at the pivot point 16, drives said inner panel in rotation about the pivot point 18 over an angular displacement larger than that of the baffle 2. The pivot point 18 is situated either literally along the baffle 2 or in the sides 11. One will note that the drive actuator 6 is mounted fixed on the stationary structure of the thrust reverser and does not have a variation in its angular position between a forward-thrust position and a thrust-reversal position.

In order to increase the displacement of the inner panel 13 inside the baffle 2, the upstream end of the inner panel 13 is bounded in such a manner so as to be most downstream of the spoiler 12 of the baffle 2, while assuring contour continuity of the exhaust nozzle 14 and sealing the stationary structure in the forward-thrust mode. This design also allows the benefit when in the thrust-reversal position of a greater length h for the spoiler 12.

It is also to be noted that retracting the inner structure 14 of the displaceable panel 13 inside the baffle 2 increases the possibilities for regulating the distance H, a significant geometric parameter denoting the distance between said inner structure 14 of the displaceable panel 13 and the downstream end of the stationary structure.

As shown in FIG. 4, the sealing of the exhaust outlet near the engine axis is realized by the downstream end 30 of the displaceable panels 13, thereby allowing the possibility of additional regulation of the deployed position of the baffles 2 until their respective downstream ends 4 are also in contact, said ends 4 being aligned or upstream of the downstream ends 30 of the displaceable panel. One may, according to the desired purpose, maintain, or not, in the thrust-reversal position, a leakage between the ends 30.

For the case of driving by a lateral side actuator, bearing of the opening stop is implemented either between the baffles 2, or between the displaceable panels 13, or by the actuators and the linkrods.

Moreover, this also allows, in the forward-thrust position, to bring said downstream ends 4 back into a plane which is as close as possible to a plane perpendicular to the engine axis, thereby reducing the aerodynamic losses caused by a phenomenon the expert calls "fishmouth".

The structure of the inner panel 13 overlaps that of the downstream baffle 2 in the thrust-reversal mode, allowing one to use a lighter structure for said downstream baffle, the latter not being in contact with the primary hot flow of the thrust reverser.

Figure 6:
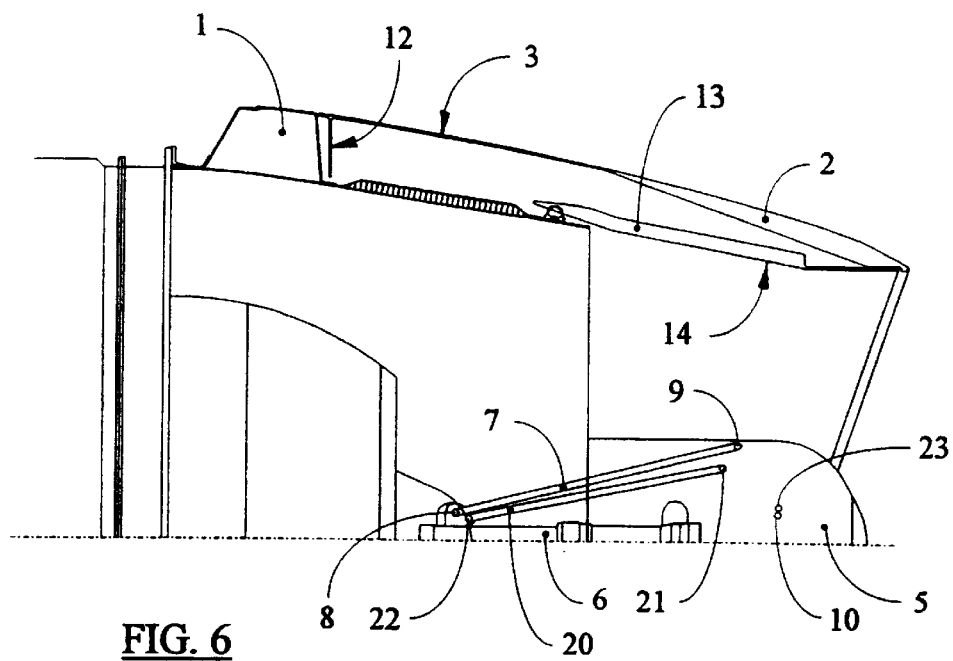
FIG. 6 shows a half view similar to FIG. 1 of a thrust reverser fitted with downstream baffles in the forward-thrust mode in an embodiment of the invention comprising a retracting inner displaceable panel pivoting about a stationary pivot.
Figure 7:
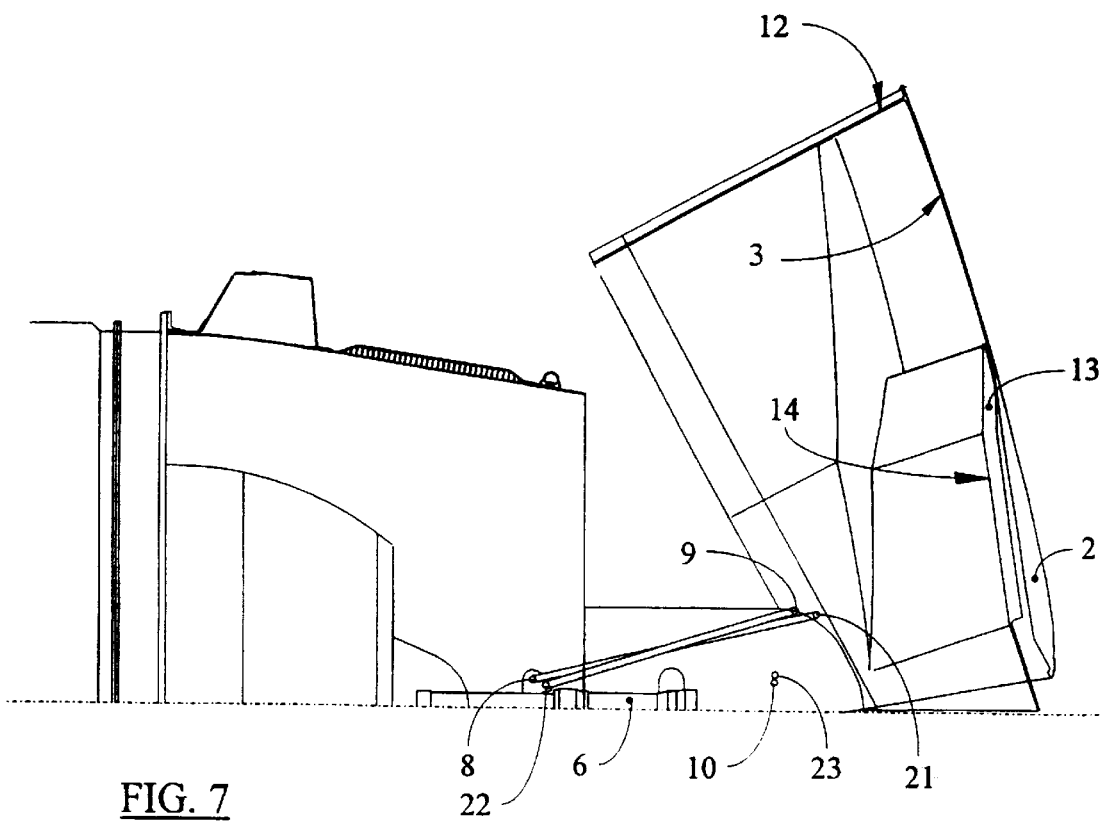
FIG. 7 shows the embodiment of the invention described according to FIG. 6 in the thrust-reversal mode.

FIGS. 6 and 7 propose a variation of the above-described embodiments as regards the manner of driving the displaceable inner panel 13.

In this embodiment, an actuator 6 simultaneously drives two linkrods 7 and 20. The linkrod 7 at its end 8 is connected to the displaceable part of the actuator, its other end being linked to the point 9 rigidly affixed on the baffle 2 of which the pivot 10 is rigidly affixed on the beam 5. The second linkrod 20 also has one of its ends connected to the displaceable part of the actuator at the point 22, its other end being connected at the point 21 rigidly joined to the displaceable panel 13 of which the pivot point 23 is also rigidly affixed on the beam 5.

The points 8 and 22 may coincide or not, and may be positioned on the actuator in a manner to obtain the desired kinematics. The positions of points 9, 10, 21 and 22 depending on the desired kinematics, the pivot points of the baffle 2 and the panel 13 may be concentric.

Figure 8:
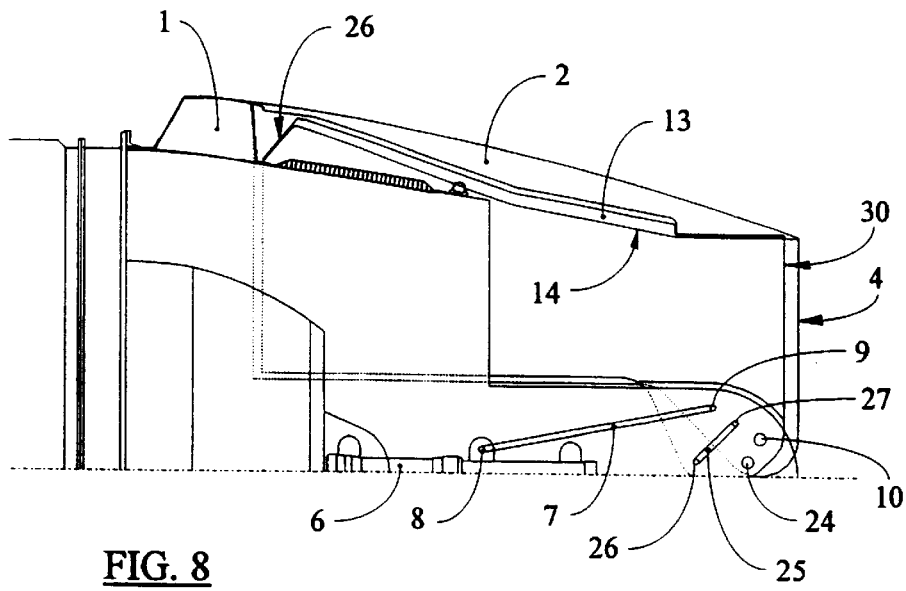
FIG. 8 shows a half view similar to FIG. 1 of a thrust reverser fitted with downstream baffles in the forward-thrust mode in an embodiment of the invention comprising an extending displaceable inner panel.
Figure 9:
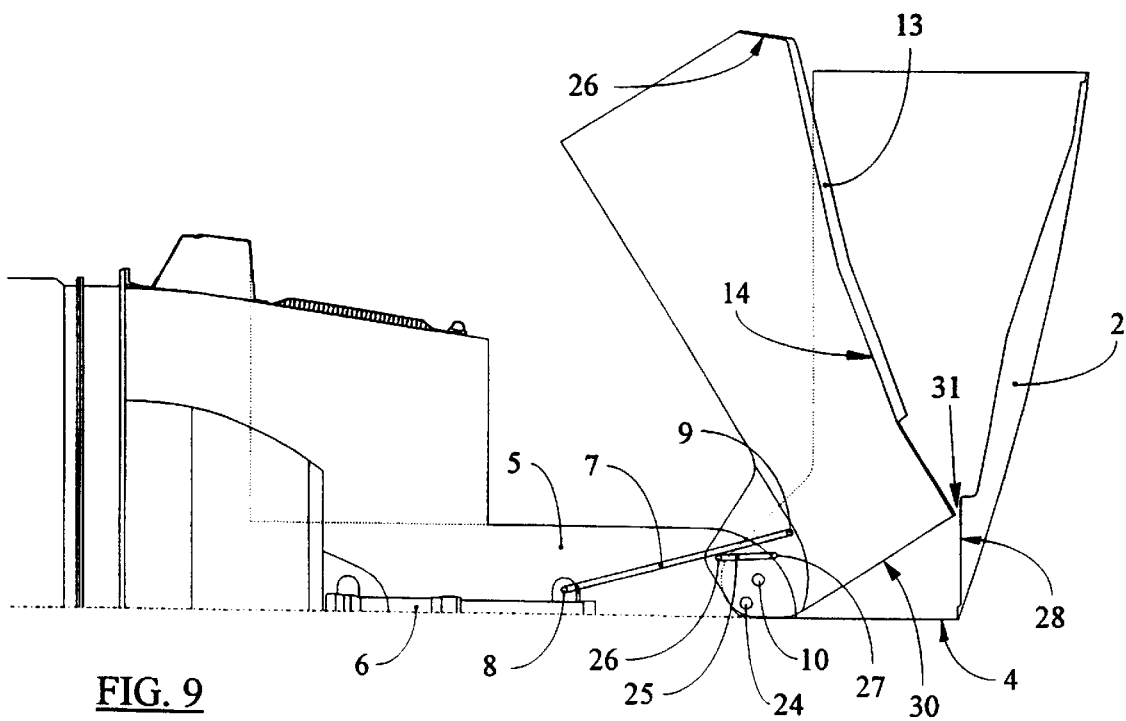
FIG. 9 shows the embodiment of the invention of FIG. 8 in the forward-thrust mode.

FIGS. 8 and 9, show another embodiment of the invention according to which the baffle 2 and its associated inner panel 13 move apart from each other when deploying into the thrust-reversal position, the displaceable panel 13 has an angular displacement less than that of the baffle 2.

The deployment of the inner panel 13 into the thrust-reversal position is realized by an actuator 6 generally situated in the side arms or beams 5 of the stationary structure 1, displacing a linkrod 7 of which one end is attached at the point 9 rigidly affixed on said panel, driving this panel in rotation about the pivot point 24 rigidly affixed on the stationary structure. During this motion, a linkrod 25 of which one end is connected to the inner panel 13 at the point 26, the other end being connected to the baffle 2 at the point 27, drives said baffle in rotation about the pivot point 10 rigidly affixed on the stationary structure.

In the thrust-reversal position, guidance of the flow is assured by the downstream portion of the inner wall 28 of the baffle 2 as well as by the whole of the inner wall 14 of the inner panel 13 and the spoiler 26 situated at its upstream end, sealing of the exhaust outlet near the engine axis being assured by the downstream end 4 of said baffle 2,the latter being situated in a plane perpendicular to the engine axis.

The spoiler 26 subtends an arbitrary angle, optimized according to the desired effect, with the inner wall of the panel 13.

The existence of a leak 31 is to be noted in the thrust-reversal position, between the downstream end 30 of the inner panel 13 and the inner wall 28 of the baffle 2, it being possible to cancel or control the residual thrust of this leak, even to transform this residual thrust into additional counter-thrust. The latter is able to be, as a function of the desired aerodynamic performance, increased or decreased.

The driving of the baffles 2 and the inner panels 13 may be accomplished by a central actuator which may be mechanical, electrical, pneumatic, one-piece or telescoping, the end stop of the stroke possibly being accomplished by the actuator. Said actuator is mounted in a stationary manner on the stationary upstream structure of the thrust reverser and connected by the driving linkrods to the baffles 2 and the inner panels 13.

It is to be noted that the principle of driving by linkrods described by FIGS. 6 and 7 may be applied in this design, as may be the principle of driving by the displaceable pivot associated with the baffle described by in FIGS. 4 and 5.

The arrangements of the invention make it possible to obtain in all cases an optimization of the thrust-reversal of the jet thanks to a different angular positioning between the inner panel 13 and the baffle 2 and also to reduce, even to eliminate the oblique cutout of the downstream end 4 of the baffles 2.

Moreover the particular arrangements described above make it possible to obtain in the thrust-reversal position an adjustment of the leaks and an optimal reorientation of these leaks.

What is claimed is:

1. A thrust reverser for a bypass turbojet engine, comprising:
   a stationary structure;
   at least one displaceable downstream baffle (2), the at least one displaceable baffle (2) being integrated into an outer wall of an annular bypass-flow duct so as to form a downstream end of an exhaust nozzle of the turbojet engine when in a forward-thrust position during a forward-thrust mode, the at least one di splaceable baffle (2) being arranged to deflect bypass flow for obtaining thrust reversal when in a reverse-thrust position during a thrust-reversal mode, the at least one displaceable baffle (2) being pivotably mounted on the stationary structure so as to be moveable between the forward-thrust position and the reverse-thrust position;
   a displaceable inner panel (13) associated with the at least one displaceable baffle (2); and
   at least one displacement mechanism (6,7) mounted on the stationary structure and commonly associated with the at least one displaceable baffle (2) and the associated displaceable inner panel (13), the at least one displacement mechanism (6,7) being arranged to drive the at least one displaceable baffle (2) and the associated displaceable inner panel (13) through different angular displacements when changing between the forward-thrust mode and the thrust-reversal mode.

2. A thrust reverser for a bypass turbojet engine according to claim 1, wherein the displaceable inner panel (13) is articulated about a pivot (23) rigidly affixed on the stationary structure near a side beam (5); and
   wherein the displaceable inner panel (13) is driven by the at least one displacement mechanism (6,7) through a greater angular displacement than the associated displaceable baffle (2).

3. A thrust reverser for a bypass turbojet engine according to claim 1, wherein the displaceable inner panel (13) is articulated about a pivot (24) situated on a side beam (5) of the stationary structure; and
   wherein the displaceable inner panel (13) is driven by the at least one displacement mechanism (6,7) through a lesser angular displacement than the associated displaceable baffle (2).

4. A thrust reverser for a bypass turbojet engine according to claim 1, wherein the displaceable inner panel (13) is articulated about a pivot (18) rigidly affixed on the associated displaceable baffle (2); and
   wherein the displaceable inner panel (13) is driven by the at least one displacement mechanism (6,7) through a greater angular displacement than the associated displaceable baffle (2).

5. A thrust reverser for a bypass turbojet engine according to claim 1, wherein the displaceable inner panel (13) is driven by the at least one displacement mechanism (6,7) through a lesser angular displacement than the associated displaceable baffle (2).

6. A thrust reverser for a bypass turbojet engine according to claim 4, further comprising:
   a connecting linkrod (15) which connects the displaceable inner panel (13) to a side beam (5) of the stationary structure; and
   wherein the common displacement mechanism (6,7) comprises an actuator (6) and a driving linkrod (7), the actuator (6) being mounted in a stationary manner on the stationary structure, the driving linkrod (7) being attached to the at least one displaceable baffle (2) and being driven by the actuator (6).

7. A thrust reverser for a bypass turbojet engine according to claim 1, wherein the at least one displaceable baffle (2) defines a central cavity bounded by an end (3) and sides (11); and
   wherein the displaceable inner panel (13) is of less width than the associated displaceable baffle (2) such that the displaceable inner panel (13) is housed within the central cavity during the thrust-reversal mode to ensure guidance of exhaust flow.

8. A thrust reverser for a bypass turbojet engine according to claim 2, wherein the at least one displaceable baffle (2) defines a central cavity bounded by an end (3) and sides (11); and
   wherein the displaceable inner panel (13) is of less width than the associated displaceable baffle (2) such that the displaceable inner panel (13) is housed within the central cavity during the thrust-reversal mode to ensure guidance of exhaust flow.

9. A thrust reverser for a bypass turbojet engine according to claim 3, wherein the at least one displaceable baffle (2) defines a central cavity bounded by an end (3) and sides (11); and
   wherein the displaceable inner panel (13) is of less width than the associated displaceable baffle (2) such that the displaceable inner panel (13) is housed within the central cavity during the thrust-reversal mode to ensure guidance of exhaust flow.

10. A thrust reverser for a bypass turbojet engine according to claim 4, wherein the at least one displaceable baffle (2) defines a central cavity bounded by an end (3) and sides (11); and
    wherein the displaceable inner panel (13) is of less width than the associated displaceable baffle (2) such that the displaceable inner panel (13) is housed within the central cavity during the thrust-reversal mode to ensure guidance of exhaust flow.

11. A thrust reverser for a bypass turbojet engine according to claim 5, wherein the at least one displaceable baffle (2) defines a central cavity bounded by an end (3) and sides (11); and
    wherein the displaceable inner panel (13) is of less width than the associated displaceable baffle (2) such that the displaceable inner panel (13) is housed within the central cavity during the thrust-reversal mode to ensure guidance of exhaust flow.

12. A thrust reverser for a bypass turbojet engine according to claim 6, wherein the at least one displaceable baffle (2) defines a central cavity bounded by an end (3) and sides (11); and
    wherein the displaceable inner panel (13) is of less width than the associated displaceable baffle (2) such that the displaceable inner panel (13) is housed within the central cavity during the thrust-reversal mode to ensure guidance of exhaust flow.

13. A thrust reverser for a bypass turbojet engine according to claim 2, wherein the common displacement mechanism (6,7) comprises an actuator (6), a first linkrod (7) and a second linkrod (20), the actuator (6) being mounted in a stationary manner on the stationary structure and having a moveable part, the first linkrod (7) connecting the at least one displaceable baffle (2) to the moveable part of the actuator (6), the second linkrod (20) connecting the associated displaceable inner panel (13) to the moveable part of the actuator (6).

14. A thrust reverser for a bypass turbojet engine according to claim 3, wherein the common displacement mechanism (6,7) comprises an actuator (6), a first linkrod (7) and a second linkrod (25), the actuator (6) being mounted in a stationary manner on the stationary structure and having a moveable part, the first linkrod (7) being attached to the displaceable inner panel (13) and being driven by the actuator (6), the second linkrod (25) connecting the at least one displaceable baffle (2) to the associated displaceable inner panel (13); and wherein the common displacement mechanism (6,7) is arranged to drive the at least one displaceable baffle (2) and the associated displaceable inner panel (13) such that a leak (31) is created between an inner wall (28) of the at least one displaceable baffle (2) and a downstream end (30) of the associated displaceable inner panel (13) when in the thrust-reversal mode.

\* \* \* \* \*

UNITED STATES PATENT AND TRADEMARK OFFICE
CERTIFICATE OF CORRECTION

PATENT NO.    : 6,170,255 B1                                                Page 1 of 1
DATED         : January 9, 2001
INVENTOR(S)   : Gonidec et al.

It is certified that error appears in the above-identified patent and that said Letters Patent is hereby corrected as shown below:

Column 3,
Line 19, "literally" should read -- laterally --.

Column 4,
Line 15, "position," should read -- position such that --.

Column 5,
Line 10, "di splaceable" should read -- displaceable --.

Signed and Sealed this

Twenty-first Day of January, 2003

JAMES E. ROGAN
*Director of the United States Patent and Trademark Office*